United States Patent [19]

Zimmermann et al.

[11] 3,930,768
[45] Jan. 6, 1976

[54] BLOW-HEAD FOR TUBULAR FILM

[75] Inventors: Werner Josef Zimmermann, Lengerich of Westphalia; Hartmut Upmeier, Tecklenburg, both of Germany

[73] Assignee: Windmoller & Holscher, Lengerich of Westphalia, Germany

[22] Filed: Feb. 12, 1974

[21] Appl. No.: 441,753

[30] Foreign Application Priority Data
Feb. 12, 1973 Germany............................ 2306834

[52] U.S. Cl............ 425/72; 425/387 R; 425/326 R; 425/461
[51] Int. Cl.² ......................................... B29D 23/04
[58] Field of Search....... 425/DIG. 208, 144, 326 R, 425/461, 376, 387 R, 380, DIG. 2, 72

[56] References Cited
UNITED STATES PATENTS
3,647,339    3/1972    Upmeier .............................. 425/326

FOREIGN PATENTS OR APPLICATIONS
1,927,733    2/1971    Germany.......................... 425/326 R
2,028,412    12/1971   Germany.......................... 425/326 B Primary Examiner—Francis S. Husar
Assistant Examiner—Robert J. Charvat
Attorney, Agent, or Firm—Fleit & Jacobson

[57] ABSTRACT

In a blow-head for producing tubular film from thermoplastic molten material and comrising a housing with a central supply conduit for the molten material and distributing passages radiating from the supply conduit to a respective distributing helix of an insert member, means for internally cooling the blown film comprise concentric air inlet and outlet passages extending axially of the housing and each connected to at least one inlet tube and one outlet tube, respectively, the tubes being disposed between adjacent said radiating distributing passages and extending to the exterior of the housing.

4 Claims, 5 Drawing Figures

BLOW-HEAD FOR TUBULAR FILM

The invention relates to a blow-head for producing tubular film from thermoplastic molten material, comprising a housing with a central supply conduit for the molten material, and distributing passages which radiate from the supply conduit and each open into a respective distributing helix of an insert member which forms with the housing an overflow gap located downstream of the helix.

Blow-heads are nowadays provided with means for internally cooling the blown film by means of an exchange of cooling air and such internal cooling means have enabled a considerably higher production rate to be achieved. Since the internal cooling means are particularly important for blow-heads which have a small nominal size and yet are to be operated to give a high output but have a much larger consumption of cooling air in comparison with blow-heads of large nominal size because of the less favourable surface/mass ratios of the smaller hoses, it is usual to depart from the arrangement of a central supply conduit for the molten material. Instead, the molten material is introduced laterally so as to permit the accommodation of large central apertures in the blow-head housing for the passage of the cooling air and the withdrawal of the heated air. However, one-sided lateral introduction of the molten material causing uneven heating of the blow-head could result in difficulties so that, every time the output rate or the nature of the material is changed and corresponding alterations in the temperature of the molten material occur, undesirable adjustment of the nozzle or of the blow-head must be carried out.

The invention aims to provide a blow-head that avoids these disadvantages, i.e., a blow-head which, even if there are large passages for cooling air in its interior, is insensitive to changes in the output or in the plastics material that is being employed and need therefore not be constantly adjusted. With this purpose in mind, the invention employs particular internal cooling means with replacement of the cooling air, which cooling means could not hitherto be used for a blow-head having a central supply conduit for the molten material.

According to the invention, a blow-head for producing tubular film from thermoplastic molten material comprises a housing with a central supply conduit for the molten material, and distributing passages which radiate from the supply conduit and each open into a respective distributing helix of an insert member which forms with the housing an overflow gap, including means for internally cooling the blown film, said cooling means comprising concentric air inlet and outlet passages extending axially of the housing and each connected to at least one inlet tube and one outlet tube, respectively, the said tubes being disposed between adjacent said radiating distributing passages and extending to the exterior of the housing.

By means of the invention, a high through-put of cooling air is obtainable despite the central feeding of molten material and it is therefore possible to employ the advantages of cooling means with air exchange for the interior of the blown film in the case of blow-heads having a central supply for the molten material.

The distributing passages may be formed in an obtuse-angled conical surface, the inlet and outlet tubes extending substantially normal to said conical surface. By having the distributing passages in an obtuse-angled conical surface, inlet and outlet tubes of large diameter can be employed even for blow-heads of small nominal size.

There is preferably an equal even number of distributing passages and inlet and outlet tubes, the inlet and outlet tubes being provided in an alternating arrangement in the circumferential direction. In a particularly advantageous construction, the outlet tubes constitute the diverging branches of a breeches pipe of which the leg is disposed centrally of the housing and defines the air outlet passage, whilst the inlet tubes open into a collecting chamber leading to the aforementioned air inlet passage which is disposed concentrically around the leg of the breeches pipe and is connected to an internal air nozzle of the blow-head.

Examples of the invention will now be described with reference to the accompanying drawings wherein.

Figure 1:
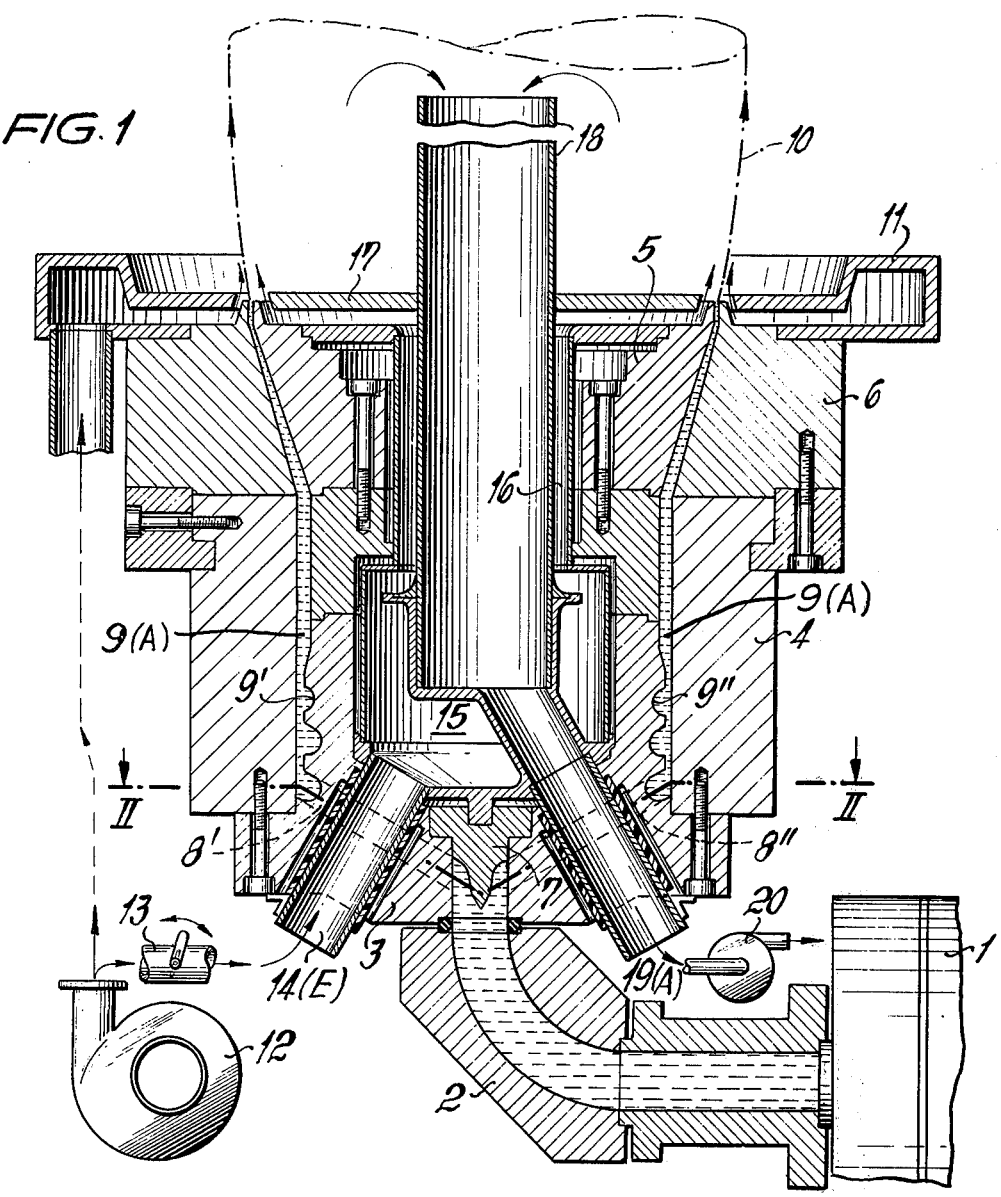
FIG. 1 is a cross-section through a blow-head.

Referring to FIG. 1, an extruder 1 delivers molten thermoplastic material, through a connecting member 2 having a curved bore, to a distributing member 3 of a blow-head housing 4. The housing is equipped with nozzle rings 5 and 6 between which the plastics material is ejected to form a blown bubble 10. Blades 7 provided in the distributing member 3 divert the molten material into distributing passages 8', 8" formed in the surface of an obtuse-angled cone. The distributing passages open into respective distributing helices 9', 9" out of which the molten material passes from the initially circumferential flow to axially directed flow towards the nozzle orifice. The region of the axial flow is defined by an annulus that constitutes an overflow gap 9(A) located downstream of the helices. The bubble 10 of blow film is taken off in conventional manner, flattened and coiled.

For the exterior cooling of the blown film, there is a cooling ring 11 to which air is supplied by a diagrammatically indicated fan 12 which, through a branch conduit fitted with a throttle 13, also supplies air for the internal cooling of the film. The internal cooling air is fed to a collecting chamber 15 through an inlet tube 14 and passes through an annular air inlet passage 16 to an internal cooling ring 17 at which the air enters the blown film. The heated internal cooling air is discharged through an air outlet passage that preferably extends upwardly right up to a level at which the blown film is flattened. This air outlet passage is defined by a pipe 18 extending concentrically through the inlet passage 16 and leading to an air outlet tube 19. The heated air is passed through the pipe 18 and tube 19 by means of a suction fan 20. If a plurality of the tubes 14 and 19 is provided, as hereinafter described with reference to FIGS. 3 to 5, the blow-head would also comprise distributing and collecting tubes (not shown in FIG. 1) for respectively distributing or collecting the streams of air.

The or each inlet tube 14 and the or each outlet tube 19 extend substantially perpendicular to the conical surface in which the distributing passages 8', 8" are formed, the tubes being provided in an alternating arrangement. It should be noted that, if there is a plurality of outlet tubes 19, these would constitute the diverging branches of a breeches pipe of which the leg is the pipe 18, the centre lines of the pipes 14 and 19 being disposed on an acute-angled conical surface.

As will be evident from FIG. 1, the air tubes 14 and 19 open to the exterior of the blow-head in the vicinity of the connecting member 2. They can be readily connected to spiral hoses without danger of the latter becoming damaged by touching the hot parts of the blow-head.

Figure 2:
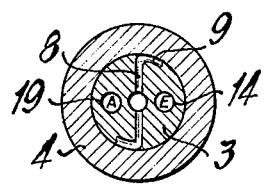
FIG. 2 is a section taken on the line II—II in FIG. 1.
Figure 3:
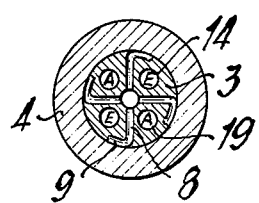
FIG. 3 is a section similar to FIG. 2 but taken through an embodiment employing four sets of air tubes and distributing passages for the plastics material.
Figure 4:
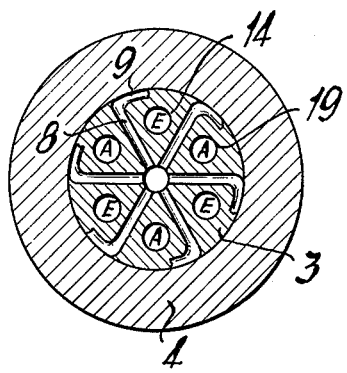
FIGS. 4 and 5 are enlarged cross-sections similar to FIGS. 2 and 3 but taken through embodiments employing six and eight sets, respectively, of air tubes and distributing passages.
Figure 5:
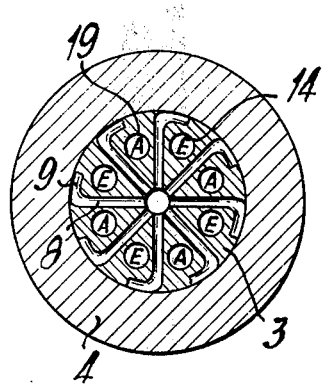

FIG. 2 indicates the alternative arrangement of outlet tube 19, distributing passage 8, inlet tube 14, and distributing passage 8, in the case of the FIG. 1 construction employing a total of two tubes 14, 19 and two distributing passages. The inlet and outlet tubes are also provided with the reference letters E and A, respectively. FIGS. 3 to 5 show the alternating arrangements for embodiments employing a total of four, six and eight tubes, respectively, between four, six and eight distributing passages 8 leading to four, six and eight distributing helices 9. For the sake of clarity, thermal insulators that would normally be provided for the members 14, 15, 16 and 19 have been omitted from the drawings.

By providing the distributing passages 8 and the tubes 14, 19 along respective cones that are substantially normal to one another, the basic dimensions of the blow-head (diameter and length) can be influenced within a comparatively wide range by appropriate selecting the angles of the cones, thereby permitting the tubes 14, 19, which have as large a cross-section as possible, to be accommodated between the inlet ends of the distributing helices 9 and the distributing blade 7.

We claim:

1. A sheet blow head for the manufacture of sheet tubes from a thermoplastic material with central melt feed line and with distributing bores that extend radially from it to the blow head casing, and which open into one distributing helical member of the blow head insert forming an increasingly larger overflow gap with the blow head casing, wherein the distributing bores take their course in the generated surface of an obtuse-angled cone, and an internal air cooling system, the improvement comprising channels supplying and exhausting interior air consisting of concentric pipes that penetrate the blow head axially, while the co-axial air supply channels are connected with the pertinent air conduits outside the blow head via, at least, one feed pipe and outlet pipe, each which extend substantially vertically through the generated surface of the cone and between adjoining distributor bores.

2. A blowhead for producing tubular film from thermoplastic molten material comprising:
   a housing with a central supply conduit for the molten material;
   an insert member inserted into said housing having a plurality of distributing helices which form with said housing an overflow gap located downstream of said helices;
   distributing means for conducting molten material from said central supply conduit to said plurality of distributing helices comprising a plurality of distributing passages having one end connected to said central supply conduit and the other end connected to one of said plurality of helices, said one ends being connected to said central supply conduit so that said plurality of distributing passages form the conical surface of an obtuse-angled cone and radiate from said central supply conduit with said central supply conduit coincident with the apex of said obtuse-angled conical surface; and
   means for internally cooling blown film comprising concentric air inlet and outlet passages extending axially of said housing, and at least one inlet tube connected to said inlet passage and one outlet tube having one end connected to said outlet passage, said one ends being connected to said concentric air inlet and outlet passages and extending to the exterior of the housing intersecting the conical surface of said obtuse-angled cone at substantially right angles.

3. A blow head according to claim 2 wherein there is an equal even number of distributing passages and tubes and wherein the inlet and outlet tubes are provided in an alternating arrangement.

4. A blow head according to claim 2, wherein the at least one inlet tube and said at least one outlet tube constitute the diverging branches of a breeches pipe of which one leg is disposed centrally of the housing and defines the said air outlet passage, and wherein the at least one inlet tube opens into a collecting chamber leading to the said air inlet passage which is disposed concentrically around the leg of the breeches pipe and is connected to an internal air nozzle of the blowhead.

* * * * *